United States Patent [19]

Weaver

[11] 4,183,469

[45] Jan. 15, 1980

[54] HAND HELD SEED SOWER

[76] Inventor: Hardy P. Weaver, 3911 Magnolia, Knoxville, Tenn. 37914

[21] Appl. No.: 848,863

[22] Filed: Nov. 7, 1977

[51] Int. Cl.² .............................................. A01C 17/00
[52] U.S. Cl. ..................................... 239/687; 111/10; 200/61.62; 222/333
[58] Field of Search .................. 111/10, 11; 239/650, 239/653, 668, 684, 686, 681, 687–689; 222/333, 158; 200/61.62, 61.71, 61.75, 61.74, 61.73

[56] References Cited

U.S. PATENT DOCUMENTS

| | | | |
|---|---|---|---|
| 795,559 | 7/1905 | Speicher | 239/686 |
| 2,547,143 | 4/1951 | Speicher | 239/684 X |
| 2,548,034 | 4/1951 | Major | 200/61.74 X |
| 2,691,530 | 10/1954 | Kroeger | 239/686 |
| 2,723,860 | 11/1955 | Weeks | 111/11 X |
| 2,992,008 | 7/1961 | Speicher | 239/686 |
| 3,013,698 | 12/1961 | Gordon et al. | 222/158 |
| 3,209,486 | 10/1965 | Kenney | 222/333 |
| 3,513,273 | 5/1970 | Qualheim | 200/61.62 |
| 3,993,225 | 11/1976 | Manni | 239/653 X |

FOREIGN PATENT DOCUMENTS 423829  1/1926  Fed. Rep. of Germany ........... 239/686

*Primary Examiner*—Edgar S. Burr
*Assistant Examiner*—Steven A. Bratlie
*Attorney, Agent, or Firm*—Luedeka & Hodges

[57] ABSTRACT

A seed sower includes a storage container which includes a discharge panel having an inner wall and an outer wall spaced from the inner wall. An inner aperture is defined in the inner wall and an outer aperture, defined in the outer wall, communicates with the inner aperture by means of a passageway. Bracket means are rigidly attached to the container and battery powered motor means is rigidly attached to the bracket means. A distribution plate means is rotated by the motor means and disposed opposite and spaced from the outer aperture.

5 Claims, 3 Drawing Figures

HAND HELD SEED SOWER

The present invention relates generally to the field of gardening and more particularly to an apparatus for broadcast sowing seeds.

In field of gardening, it is frequently desirable to distribute seeds over a large area. It is well-known that grass and other forage plants, such as clover, are sown throughout an area rather than in distinct rows. In addition, many other seeds are broadcast sown. For example, when a garden has completed its regular season, many gardeners turn the soil and then sow the entire bed in a crop such as turnips or mustard. Flower beds are also frequently sown in a broadcast manner rather than in rows.

When seeds are sown throughout an area, it is generally desirable for the distribution to be random because heavily clustered plants tend to inhibit each other's growth and sparsely sown areas produce inefficient plants. Heretofore gardeners have merely scattered handfuls of seeds in an attempt to achieve a random distribution. However, such efforts are generally unsuccessful. The seeds remain clustered as they fall to the ground. This method is also quite time consuming and the gardener often entirely misses some portions when a large area is sown.

Consequently, apparatus has been developed to distribute seeds randomly throughout large areas. One such apparatus comprises a bag and a funnel. The large end of the funnel communicates with the interior of the bag which is filled with seeds. The funnel is waved back and forth as the operator walks through the bed being sown. The seeds are strewn from the outboard, narrow end of the funnel by centrifugal force. Although the bag-and-funnel is more effective than hand sowing, the distribution remains uneven. Arc-shaped patterns of alternating concentrated and sparse patches are easily discernible among the growing plants.

Another prior art device comprises a sack, the lower edge of which is attached about the periphery of a rigid base. Seeds contained in the sack are allowed to pass through the base to strike a rotating wheel powered by a hand crank. These sowers adequately distribute large seeds, i.e. oats, wheat or other seeds having a maximum dimension greater than about 1/16 inch. Even with this device, the distribution is inconsistent because the cranking rate varies, but in the case of such large seeds, small variations are insignificant in relation to the total volumes sown.

However, the known sowing apparatus are particularly unsatisfactory for the distribution of small seeds, i.e. those having a maximum dimension which is less than about 1/16 inch. Tobacco seed which is broadcast sown in beds, then later transplanted in rows, is one example of a seed for which prior sowers have not been satisfactory. The amount of tobacco seed required to sow a 900 sq. ft. bed weighs only about $\frac{1}{4}$ to $\frac{1}{2}$ oz. The volume of this amount of seed has generally been too small to permit the seed to be sown alone, either by manual tossing or by prior sowers. The individual seeds are too small to handle manually and the mechanical sowers generally drop all of the seed in one small patch or absorb large percentages of the seed within the crevices of the apparatus. Consequently, it has been common practice to mix the seed with a carrier material such as sand, meal or even ashes. Such mixtures provide volumes which can be handled either manually or with prior sowers. However, the same problems discussed above, i.e. seed concentrations, are encountered as with large seeds. In addition, the concentration problems are magnified because the seeds do not remain evenly distributed throughout the mixture. The density and size of the seed are generally not the same as those of the carrier material. Consequently, the denser, or in some cases smaller, material sinks to the bottom of the container in which the mixture is carried. The seeds are thus concentrated in either the top or bottom of the container and as a result concentrated in the portion of the bed which is sown first or last. It is also difficult for the operator to ascertain the quantity of seed being sown when it is unevenly mixed with a carrier.

It is thus an object of the present invention to provide a sower for broadcast sowing small seeds, particularly those seeds having a maximum dimension of less than about 1/16 inch. It is a further object to provide a sower which does not require a carrier material for small seeds. It is an additional object to provide a sower which broadcasts seeds at a relatively constant rate which is easily monitored. Other objects and advantages of the invention will become apparent from the following detailed description, particularly when taken with reference to the drawings in which.

Figure 1:
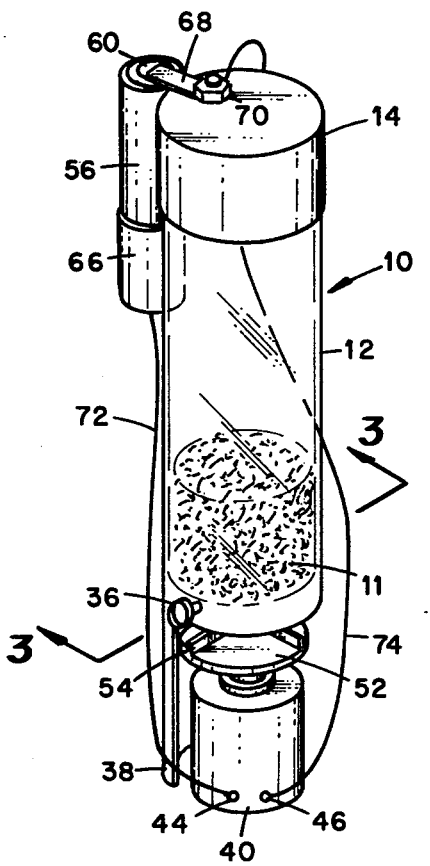
FIG. 1 is a perspective view of a sower embodying various of the features of the present invention.

Referring to the drawings in one embodiment of the present apparatus, a container 10 for seeds 11 is defined by an elongated rigid tube 12 which in a preferred embodiment is of a transparent material such as 1.5 mm rigid cellulose acetate butyrate. A first end 13 of the tube is adapted to removably receive a sealing cap 14 and the second end 16 is closed by a discharge panel 18 having an inner wall 20 and an outer wall 22. An inner aperture 24 is defined within the inner wall 20 and an outer aperture 26 is defined within the outer wall 22. A passageway 28 provides flow communication between the inner aperture 24 and the outer aperture 26. In a preferred embodiment, the inner aperture 24 is circular, having a diameter of about 1 cm and the outer aperture 26 is square, being about 0.05 cm by 0.5 cm. The passageway 28 is preferably about 0.5 cm in length and progressively alters in shape and diminishes in transverse cross-sectional area from the inner aperture 24 to the outer aperture 26.

A channel 30 is defined within the discharge panel outer wall 22 adjacent the outer aperture 26. A gate 32 having a linear leading edge 33 is slidably mounted within the channel 30 and biased to a position sealing the outer aperture 26 by means of a helical spring 34. An adjusting screw 36 is disposed along the axis of the helical spring 34 and threadably received by the gate 32. Rotation of the screw 36 infinitely adjusts the gate 32 between a fully open position and a fully closed position relative to the outer aperture 26, thus controlling the effective size of the outer aperture.

Attached to, and preferably integral with, the container 10 is a bracket 38 extending generally parallel to the axis of the tube 12. An electric motor 40, including a drive shaft 42, a first terminal 44 and a second terminal 46, is rigidly attached to the bracket 38 by means of a spacer block 47 and screws 48. The axis of the shaft 42 is generally perpendicular to the plane defined by the outer aperture 26 but preferably does not pass through the outer aperture 26. The shaft 42 extends toward, but does not intersect the plane defined by the outer aperture 26 and carries a radial distribution plate 50 at its outboard end which is rotated upon rotation of the shaft. The distribution plate 50 comprises a generally planar disc 52 and a plurality of raised, radial spokes 54 on the upper surface thereof extending from the disc toward the plane defined by the outer aperture 26.

Figure 2:
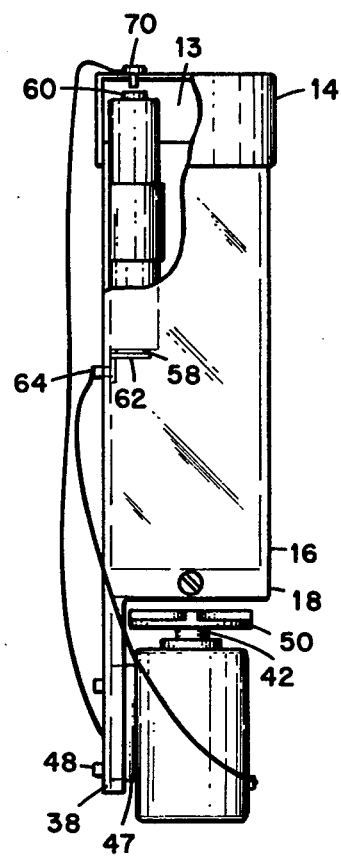
FIG. 2 is a side view partially in section of an alternative embodiment of a sower embodying various of the features of the present invention.
Figure 3:
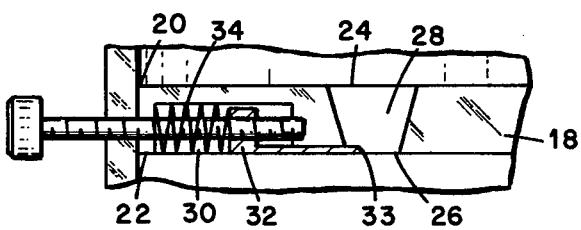
FIG. 3 is a section view of a discharge panel taken along line 3—3 in FIG. 1.

In the embodiments depicted in FIGS. 1 and 2, a battery 56, including a first terminal end 58 and a second terminal end 60, is mounted upon the container 10. A 90° push terminal 62 attached to the container tube 12, as by an electrically conducting screw 64, supports the battery 56 longitudinally by contacting the first terminal end 58. A sleeve 66 adhered to the tube 12 as by glue restrains the battery 56 laterally. As shown in FIG. 1, in an embodiment in which the battery 56 is mounted upon the exterior of the tube 12, a 180° push terminal 68 is mounted upon the cap 14, as by a conducting screw 70, adjacent the second terminal end 60 of the battery 56. As shown in FIG. 2, in an embodiment in which the battery 56 is mounted within the tube 12, the conducting screw 70 extends through the thickness of the cap 14 to a position adjacent, yet normally out of contact with, the second terminal end 60 of the battery 56.

A first electrically conducting wire 72 connects the motor first terminal 44 to the conducting screw 64. A second electrically conducting wire 74 connects the motor second terminal 46 to the conducting screw 70.

In a preferred embodiment, the motor 40 comprises a commercially available, three volt electric motor which, when powered by a 1.5 volt battery rotates the drive shaft 42 at a rate of about 3500 rpm. The cap 14 comprises a yieldable polyvinyl chloride which normally biases the terminal 68 or conducting screw 70 out of contact with the battery second terminal end 60 and permits the terminal 68 or the conducting screw 70 to be pressed into contact with the battery second terminal end 60.

In use, the gate 32 is adjusted to a closed position by rotation of the adjusting screw 36. The cap 14 is removed from the tube 12, remaining in proximity with the remainder of the sower by means of the conducting wire attached to the motor second terminal 46 and the conducting screw 70. A measured quantity of seed 11 is poured into the container 10 and the cap 14 is replaced on the end 13 of the tube 12.

In an operation of the depicted apparatus, the gate 32 is adjusted to the open position which allows the desired seed flow rate through the passageway 28 and outer aperture 26 when the sower is oriented such that the distributor plate is disposed vertically below the outer aperture. The desired flow rate depends upon the seed size and desired concentration of sown seeds. The transparent, rigid tube 12 permits the operator to easily ascertain the rate at which seed is dispersed and, if necessary, adjust the gate 32 accordingly.

The terminal 68 or screw 70 is pressed to contact the battery second terminal end 60, completing the electrical circuit between the battery 56 and motor 40. Completion of the circuit causes the rotation of the drive shaft 42 and distribution plate 50.

Seeds passing through the outer aperture 26 strike the rotating plate 50. The radial spokes 54, rotating in a horizontal plane, strike the seed sending them outwardly from the plate 50. Vibratory motion of the motor 40 is transmitted through the bracket 38 to the discharge panel 18 and the seeds adjacent thereto, preventing obstructions of the passageway 28 as the seeds are funnelled from the inner aperture to the outer aperture.

When the desired amount of seed has been sown, the gate 32 is closed by rotation of the adjusting screw 36 and pressure is released from the terminal 68 or conducting screw 70. The cap 14 biases the terminal 68 or conducting screw 70 out of contact with the battery second terminal, thus opening the electrical circuit and stopping rotation of the drive shaft 42.

A sower in accordance with the described invention distributes small seeds in a constant, random manner throughout the sown field. In addition, no carrier material is required for small seed and the rate of dispersion is easily and reliably monitored by the operator.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. A seed sower for seeds of a size approximating the size of tobacco seed comprising a cylindrical storage container for being grasped in one hand of an operator, a yieldable cap closing a first end of said container, a discharge panel at a second end of said container, said discharge panel having an inner wall and an outer wall, an inner aperture defined in said inner wall, an outer aperture defined in said outer wall and communicating with said inner aperture by means of a passageway, said passageway diminishing in cross-sectional area from said inner aperture to said outer aperture, said outer aperture having a maximum opening dimension not significantly greater than about 0.05 cm and being of a geometry that will permit the passage therethrough of seeds having a size approximating the size of tobacco seeds, a battery secured to said container, a first terminal secured to said yieldable cap in position to be connected in electrical contact with one terminal of said battery by the application of pressure applied to said terminal by the same hand which holds said storage container, bracket means rigidly attached to said container, motor means attached to said bracket means, electrically conducting wire means connecting a first terminal of said motor means to one terminal of said battery, and further electrically conducting wire means connecting a second terminal of said motor to said terminal secured to said cap, distribution plate means attached to and rotatable by said motor means and disposed opposite and spaced from said outer aperture.

2. A seed sower as defined in claim 1 wherein said battery-powered motor means is rigidly attached to said bracket means whereby vibratory motion of said motor is transmitted to said discharge panel.

3. A seed sower as defined in claim 1 wherein said distribution plate means comprises a generally planar disc having an exposed surface opposing and generally parallel to said outer aperture and radial spokes rigidly attached to said disc exposed surface.

4. A seed sower as defined in claim 1 and including an adjustable gate slidably mounted adjacent said outer aperture whereby the area of said outer aperture is infinitely variable between an open position and a closed position to control the effective size of the outer aperture.

5. A seed sower as defined in claim 1 wherein said container comprises a transparent material whereby the seed flow rate is monitorable.

* * * * *